United States Patent
Lee

(10) Patent No.: US 12,242,758 B2
(45) Date of Patent: Mar. 4, 2025

(54) STORAGE DEVICE AND AN OPERATING METHOD OF A STORAGE CONTROLLER THEREOF

(71) Applicant: SAMSUNG ELECTRONICS CO., LTD., Suwon-si (KR)

(72) Inventor: Jin Wook Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 17/967,626

(22) Filed: Oct. 17, 2022

(65) Prior Publication Data

US 2023/0146540 A1     May 11, 2023

(30) Foreign Application Priority Data

Nov. 9, 2021   (KR) .......................... 10-2021-0153232
Mar. 25, 2022   (KR) .......................... 10-2022-0037346

(51) Int. Cl.
    *G06F 3/06*          (2006.01)

(52) U.S. Cl.
    CPC .......... *G06F 3/0659* (2013.01); *G06F 3/0623* (2013.01); *G06F 3/0653* (2013.01); *G06F 3/0683* (2013.01)

(58) Field of Classification Search
    CPC .... G06F 3/0659; G06F 3/0623; G06F 3/0653; G06F 3/0683
    See application file for complete search history.

(56) References Cited

U.S. PATENT DOCUMENTS

| | | | |
|---|---|---|---|
| 6,658,548 B1 * | 12/2003 | Kochar ................. | G06F 12/145 708/203 |
| 6,948,041 B2 | 9/2005 | Chevallier et al. | |
| 7,827,370 B2 | 11/2010 | Ahvenainen et al. | |
| 8,463,747 B2 | 6/2013 | Wahlert et al. | |
| 8,706,697 B2 | 4/2014 | Morsi et al. | |
| 9,830,079 B2 | 11/2017 | Kanno | |
| 11,086,560 B2 | 8/2021 | Shu et al. | |
| 2008/0163382 A1 * | 7/2008 | Blue ................... | G06F 12/1491 726/28 |
| 2011/0239064 A1 * | 9/2011 | Byom .................... | G11C 29/10 714/E11.159 |
| 2013/0067138 A1 * | 3/2013 | Schuette ............... | G06F 3/0629 711/E12.008 |

(Continued)

OTHER PUBLICATIONS

Proskurin, Sergej, et al. "xmp: Selective memory protection for kernel and user space." 2020 IEEE Symposium on Security and Privacy (SP). IEEE, 2020. (Year: 2020).*

(Continued)

*Primary Examiner* — Nicholas J Simonetti
(74) *Attorney, Agent, or Firm* — Sughrue Mion, PLLC

(57) ABSTRACT

An operating method of a storage controller includes receiving a permanent write protection command; checking a distribution of first data included in a target namespace corresponding to the permanent write protection command; setting at least one memory region as a protected memory region, based on at least one metric corresponding to each of a plurality of non-volatile memory devices; and migrating at least a portion of the first data, which is stored in a remaining memory region different from the protected memory region, to the protected memory region.

20 Claims, 14 Drawing Sheets

(56) References Cited

U.S. PATENT DOCUMENTS

| | | | |
|---|---|---|---|
| 2015/0268873 A1* | 9/2015 | Gibbons | G06F 3/0653 |
| | | | 711/102 |
| 2018/0011760 A1 | 1/2018 | Kanno | |
| 2018/0335975 A1* | 11/2018 | Cosby | G06F 3/0688 |
| 2019/0043604 A1* | 2/2019 | Baca | G11C 29/883 |
| 2020/0285391 A1 | 9/2020 | Sun et al. | |
| 2020/0293206 A1* | 9/2020 | Isozaki | G06F 3/0622 |
| 2020/0371713 A1* | 11/2020 | Wu | G06F 3/0619 |
| 2021/0318827 A1 | 10/2021 | Bernat et al. | |
| 2021/0382643 A1* | 12/2021 | Muthiah | G06F 3/0616 |

OTHER PUBLICATIONS

Communication dated Apr. 6, 2023, issued by European Patent Office in European Application No. 22205788.7.
Communication dated May 3, 2023, issued by European Patent Office in European Application No. 22205788.7.

* cited by examiner

FIG. 7

| State | Definition | Persistent Across | |
|---|---|---|---|
| | | Power Cycles | Controller Level Resets |
| No Write Protect | The namespace is not write protected. | Yes | Yes |
| Write Protect | The namespace is write protected. | Yes | Yes |
| Write Protect Until Power Cycle | The namespace is write protected until the next power cycle. | No | Yes |
| Permanent Write Protect | The namespace is permanently write protected. | Yes | Yes |

FIG. 8

| Bits | Description |
|---|---|
| 31:03 | Reserved |
| 02:00 | Write Protection State: This field specifies the write protection state of the specified namespace.<br><br>| Value | Definition |<br>|---|---|<br>| 000b | No Write Protect |<br>| 001b | Write Protect |<br>| 010b | Write Protect Until Power Cycle |<br>| 011b | Permanent Write Protect |<br>| 100b to 111b | Reserved | |

STORAGE DEVICE AND AN OPERATING METHOD OF A STORAGE CONTROLLER THEREOF

This application claims priority to Korean Patent Application No. 10-2021-0153232 filed on Nov. 9, 2021, and Korean Patent Application No. 10-2022-0037346 filed on Mar. 25, 2022, in the Korean Intellectual Property Office, the disclosures of which are incorporated by reference herein in their entireties.

BACKGROUND

1. Field

The present disclosure relates to a storage controller, a storage device, and an operating method thereof.

2. Description of Related Art

A flash memory stores data by changing a threshold voltage of memory cells, and reads the data, using a predetermined read level. The flash memory is widely used as a non-volatile element having characteristics such as low power consumption and high integration. A typical example of a large-capacity storage device based on the flash memory is a solid state drive (SSD). With the explosive increase in demand for SSDs, their uses are diversely divided. For example, the uses may include an SSD for server, an SSD for client, an SSD for data center, and the like. An interface of the SSD needs to be able to provide optimal speed and reliability depending on the respective applications. To satisfy such requirements, an interface such as a Serial Advanced Technology Attachment (SATA), a Peripheral Component Interconnection Express (PCIe), a Serial Attached Small Computer System Interface (SAS), and the like may be used as an SSD interface. In particular, recently, a non-volatile memory express (NVMe) interface, which has emerged as a successor to a PCIe-based interface, has recently been actively researched and applied.

SUMMARY

Provided are an operating method of a storage controller and a storage system in which data stability and reliability are enhanced by preventing data of a permanent write protection region from being affected by a data access of other regions.

Also provided are an operating method of a storage controller and a storage system in which retention characteristics of permanent data are excellent by physically separating a permanent write protection region and a non-protection region.

In accordance with an aspect of an embodiment, an operating method of a storage controller includes receiving a permanent write protection command; checking a distribution of first data included in a target namespace corresponding to the permanent write protection command; setting at least one memory region as a protected memory region, based on at least one metric corresponding to each of a plurality of non-volatile memory devices; and migrating the first data, which is stored in a remaining memory region different from the protected memory region, to the protected memory region.

In accordance with an aspect of an embodiment, a storage system includes a plurality of non-volatile memory devices which are divided into a plurality of namespaces, and are configured to store data corresponding to each namespace of the plurality of namespaces; and a storage controller configured to drive the plurality of non-volatile memory devices, wherein the storage controller is further configured to: receive a permanent write protection command corresponding to a first namespace, check a distribution of first data included in the first namespace, set a protected memory region based on at least one metric corresponding to the each of the plurality of non-volatile memory devices, migrate the first data to the protected memory region, and migrate second data included in a second namespace and stored in the protected memory region to a remaining memory region different from the protected memory region.

In accordance with an aspect of an embodiment, a storage system includes a solid-state drive configured to operate as a multi-namespace storage device, and which includes a plurality of non-volatile memory devices, wherein each non-volatile memory device from among the plurality of non-volatile memory devices includes a physically divided protected memory region and a remaining memory region; and a storage controller configured to drive the solid-state drive and access data stored in the plurality of non-volatile memory devices, wherein the storage controller is further configured to: receive a permanent write protection command corresponding to a first namespace, check distribution of first data included in the first namespace and second data included in a second namespace in the solid-state drive, and store the first data in a memory region which is physically independent from the second data in the solid-state drive.

In accordance with an aspect of an embodiment, a storage device includes a plurality of non-volatile memory devices; and at least one processor configured to: receive a permanent write protection command; determine a distribution of first data included in a target namespace corresponding to the permanent write protection command; designate a memory region as a protected memory region, based on at least one metric corresponding to the plurality of non-volatile memory devices; locate a portion of the first data which is stored in a remaining memory region different from the protected memory region; and migrate the portion of the first data to the protected memory region.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a table for explaining the write protection command of the storage system according to an embodiment;

FIG. 8 is a table for explaining a configuration of the write protection command of a storage system according to an embodiment;

DETAILED DESCRIPTION OF THE EMBODIMENTS

Figure 1:
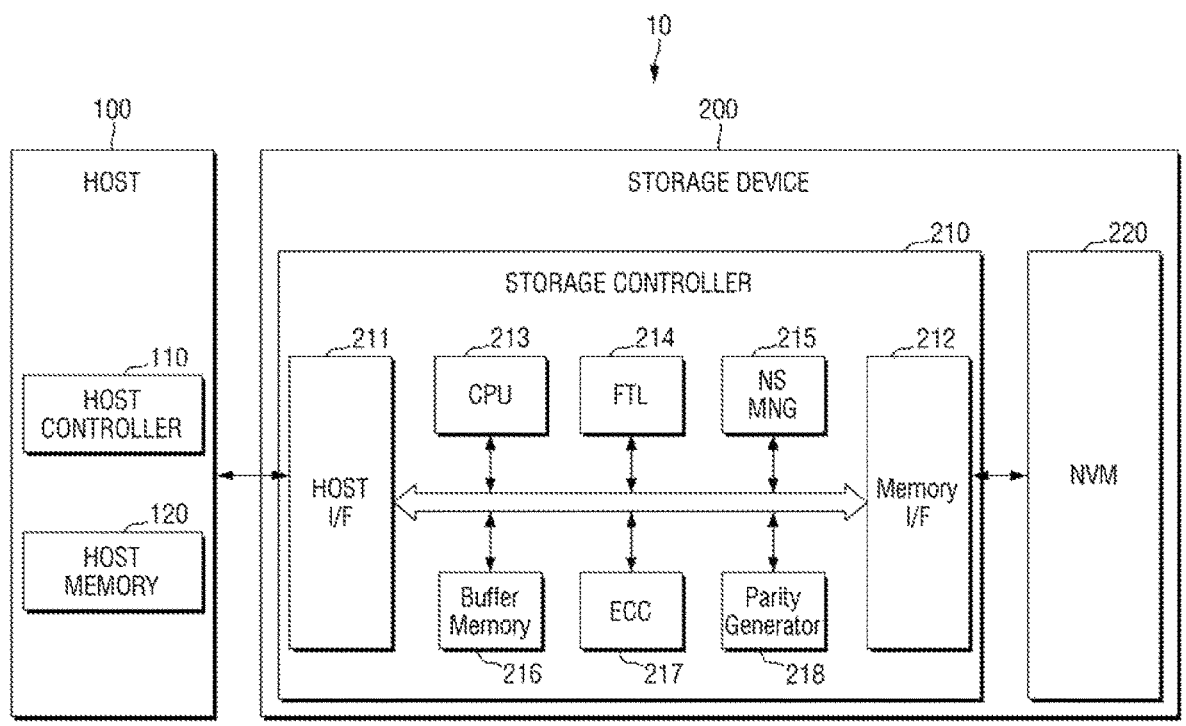
FIG. 1 is a block diagram showing a host storage system, according to an embodiment.

A storage system according to an embodiment operates on the basis of an NVM Express™ base specification revision 1.4c. Hereinafter, the storage system according to some embodiments will be described referring to the drawings.

As is traditional in the field, embodiments may be described and illustrated in terms of blocks which carry out a described function or functions. These blocks, as shown in the drawings, which may be referred to herein as units or modules or the like, or by names such as controller, interface, generator, circuit, array, buffer, storage, memory, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Figure 2:
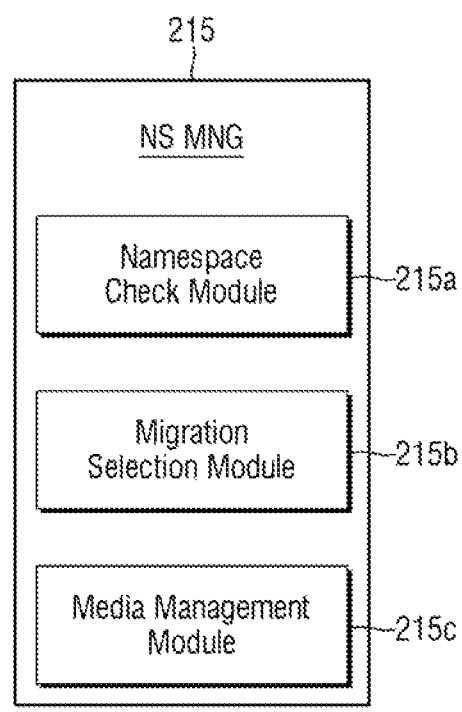
FIG. 2 is a conceptual diagram for specifically explaining a namespace management module according to an embodiment.

FIG. 1 is a block diagram showing a host storage system according to some embodiments. FIG. 2 is a conceptual diagram for specifically explaining a namespace management module according to some embodiments.

A host-storage system 1 may include a host 100 and a storage system 200. Further, the storage system 200 may include a storage controller 210 and a non-volatile memory device (NVM) 220. Further, according to an example embodiment, the host 100 may include a host controller 110 and a host memory 120. The host memory 120 may function as a buffer memory for temporarily storing the data to be transmitted to the storage system 200, or data transmitted from the storage system 200.

The storage system 200 may include storage medium for storing the data in response to a request from the host 100. As an example, the storage system 200 may include at least one of a Solid State Drive (SSD), an embedded memory, and a detachable external memory. When the storage system 200 is an SSD, the storage system 200 may be a device that complies with an NVM express (NVMe) standard. When the storage system 200 is an embedded memory or an external memory, the storage system 200 may be a device that complies with a universal flash storage (UFS) or an embedded multi-media card (eMMC) standard. The host 100 and the storage system 200 may each generate and transmit packets according to the adopted standard protocol.

When a non-volatile memory device 220 of the storage system 200 includes a flash memory, the flash memory may include a 2-dimensional (2D) NAND memory array or a 3-dimensional (3D) NAND memory array, which may be referred to as a vertical) NAND (VNAND) memory array. As another example, the storage system 200 may also include various other types of non-volatile memories. For example, a Magnetic RAM (MRAM), a spin-transfer torque MRAM, a conductive bridging RAM (CBRAM), a Ferroelectric RAM (FeRAM), a Phase RAM (PRAM), a resistive memory (Resistive RAM) and various other types of memory may be applied as the storage system 200.

According to an embodiment, the host controller 110 and the host memory 120 may be implemented as separate semiconductor chips. In some embodiments, the host controller 110 and the host memory 120 may be integrated on the same semiconductor chip. As an example, the host controller 110 may be one of a plurality of modules provided in an application processor, and the application processor may be implemented as a system on chip (SoC). Further, the host memory 120 may be an embedded memory provided inside the application processor, or a non-volatile memory or a memory module placed outside the application processor.

The host controller 110 may manage an operation of storing data (for example, write data) of the host memory 120 in the non-volatile memory device 220, or storing data (for example, read data) of the non-volatile memory device 220 in the host memory 120.

The storage controller 21 may include a host interface 211, a memory interface 212, and a central processing unit (CPU) 213. In addition, the storage controller 21 may further include a flash translation layer (FTL) 214, a namespace management module 215, a buffer memory 216, an error correction code (ECC) module 217, and a parity generator 218. The storage controller 210 may further include a working memory into which the FTL 214 is loaded, and data write and read operation on the non-volatile memory device 220 may be controlled when the CPU 213 executes the flash translation layer.

The storage controller 210 may receive a permanent write protection command from the host 100 according to some embodiments, confirm the distribution of data having a target namespace corresponding to the permanent write protection command, set a protected region on the basis of at least one metric of the plurality of non-volatile memory devices 220, for example on the basis of at least one metric of each of the plurality of non-volatile memory devices 220, and migrate the permanent data of the target namespace stored in the non-volatile memory device 220 in a distributed manner to the protected region.

Specifically, the host interface 211 may transmit and receive packets to and from the host 100. The packets transmitted from the host 100 to the host interface 211 may include command or data to be written in the non-volatile memory device 220, and packets transmitted from the host interface 211 to the host 100 may include a response to the command, data that are read from the non-volatile memory device 220, and the like. The memory interface 212 may transmit data to be written in the non-volatile memory device 220 to the non-volatile memory device 220 or receive data that are read from the non-volatile memory device 220.

The memory interface 212 may be implemented to comply with standard conventions such as a Toggle or an ONFI.

The FTL 214 may perform various functions such as address mapping, wear-leveling, and garbage collection. The address mapping operation is an operation of changing a logical address received from the host into a physical address which is used for actually storing the data in the non-volatile memory device 220. According to some embodiments, the FTL 214 may distinguish the logical and physical address for each namespace.

The wear-leveling is a technique for preventing excessive deterioration of a specific block by allowing the blocks in the non-volatile memory device 220 to be uniformly used, and may be achieved through a firmware technique for balancing the erasure counts of the physical blocks. The garbage collection is a technique for securing the capacity available in the non-volatile memory device 220 through a method for copying the valid data of a block to a new block and then erasing the existing block.

The namespace management module (NS MNG) 215 accesses the non-volatile memory device 220 separately for each namespace. For example, when a data write command is received from the host 100, a namespace identifier (ID) that distinguishes a user is confirmed, and the data write operation is performed separately for each namespace. According to some embodiments, the namespace management module 215 may confirm a distribution of data with the target namespace ID corresponding to the permanent write protection command, when receiving a permanent write protection command from the host 100. The namespace management module 215 sets any one permanent write protection region on the basis of at least one metric of each of the non-volatile memory device 220, and may migrate the data having the target namespace ID stored in the non-volatile memory device 220 in a distributed manner to the selected permanent write protection region.

Referring to FIG. 2, the namespace management module 215 may include a namespace check module 215a, a migration selection module 215b, and a media management module 215c.

The namespace check module 215a checks whether the namespace received from the host 100 is a permanent write protection region or a non-permanent write protection region. For example, the namespace check module 215a confirms the namespace ID and confirms the region determined according to the namespace on the basis of the logical address. In the embodiments, the permanent data may be data stored in the permanent write protection region, that is, a protected region, and the non-permanent data may refer to data stored in a region other than the protected region in the non-volatile memory device 220 (for example an unprotected region). The permanent data and non-permanent data may be distinguished on the basis of the namespace ID.

The media management module 215c may monitor the states of each of the plurality of non-volatile memory devices 220 and calculate the at least one metric according to some embodiments. The media management module 215c may monitor, for example, the retention characteristics on the basis of the respective metrics of the non-volatile memory device 220. The at least one metric may be an element for checking the degree of deterioration of the non-volatile memory device 220, and may include, for example, at least one of a Program/Erase (PE) cycle, a Read Count, a temperature, a block position, or a usage time.

The migration selection module 215b may set a region having good retention characteristics based on the at least one metric of each non-volatile memory device 220 (for example, a region having maximum retention characteristics) as a protected region in the plurality of non-volatile memory devices 220 according to some embodiments. That is, the protected region may have higher retention characteristics than the unprotected region. In embodiments, the protected region may be a region having better retention characteristics than the unprotected region. According to some embodiments, the protected region may be implemented in memory units that may operate according to the erase command. According to some embodiments, the protected region may be implemented in memory units that are physically distinguished from the unprotected region by a plane, a chip or a die, however embodiments are not limited thereto.

The migration selection module 215b may migrate the data of the target namespace ID stored in the physically same region of the non-volatile memory device 220 by being mixed with data of another namespace ID to the set protected region, as the block size of the non-volatile memory according to some embodiments increases. According to some embodiments, the physically same region may be any one of a memory unit that performs arbitrary commands, and a memory unit that is divided by a plane, a chip, a die, and the like.

The buffer memory 216 may be configured inside the storage controller 210, but may be placed outside the storage controller 210.

An ECC module 217 may perform error detection and correction functions on the read data that are read from the non-volatile memory device 220. More specifically, the ECC module 217 may generate parity bits on the write data to be written on the non-volatile memory device 220, and the parity bits thus generated may be stored in the non-volatile memory device 220 together with the write data. When reading the data from the non-volatile memory device 220, the ECC module 217 may correct an error of the read data, using the parity bits that are read from the non-volatile memory device 220 together with the read data, and output the read data with a corrected error.

The parity generator 218 may generate parity data in preparation for loss of permanent data and recover the data when a problem occurs in the data. That is, the parity generator 218 generates additional error correction information about the permanent data. According to an embodiment, the parity generator 218 may execute an XOR computation on the permanent data to generate the parity data. According to another embodiment, the parity generator 218 may use an erasure coding method as a method for generating the parity data. The erasure coding is a technique for recovering the parity data to separate parity data prepared in advance in the event of data loss, and the parity data may be stored in a plurality of nodes or disks constituting the non-volatile memory device 220 in a distributed manner. In embodiments, the number of distributed and stored nodes may be smaller than the actual number of non-volatile memory devices.

When the permanent data is migrated, the parity generator 218 may update the parity data to correspond to the migrated permanent data. The permanent data and the parity data of the permanent data may be stored together. According to some embodiments, the parity generator 218 may be implemented by being included in the ECC module 217, or may be implemented separately according to some embodiments.

Figure 3:
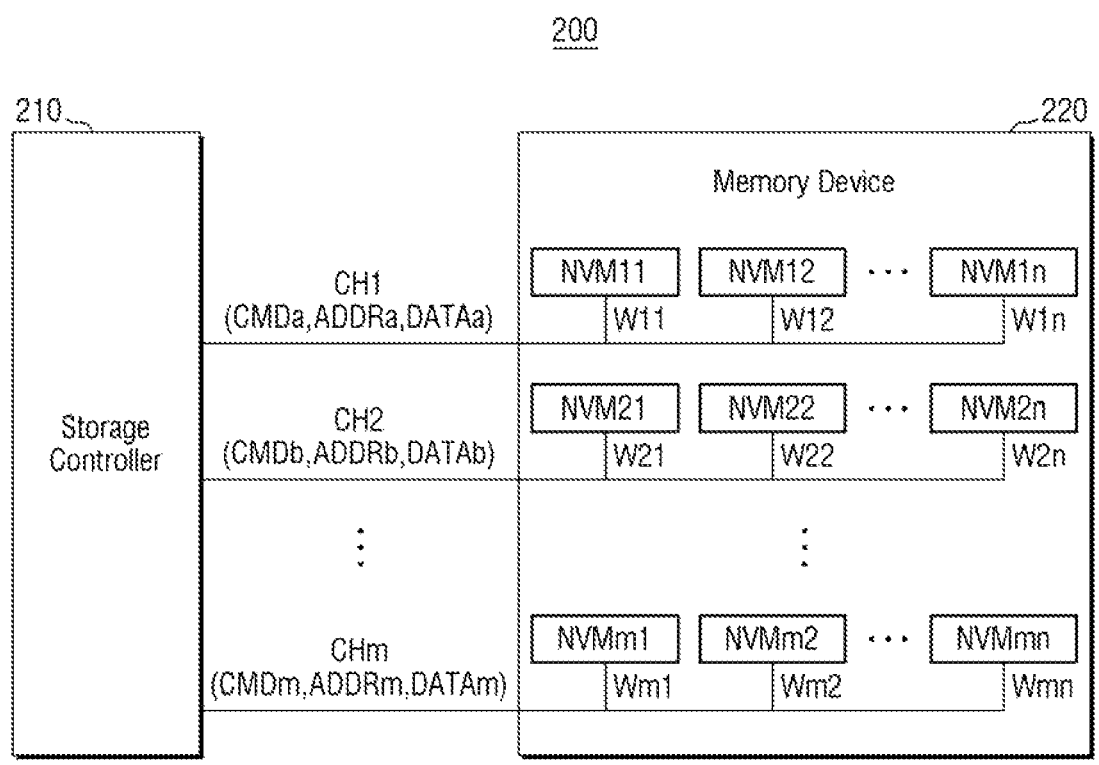
FIG. 3 is a block diagram for explaining a storage system according to an embodiment.

FIG. 3 is a block diagram for explaining a storage system according to an embodiment. Referring to FIG. 3, a storage system 200 may include a non-volatile memory device 220 and a storage controller 210. The storage system 200 may support a plurality of channels CH1 to CHm, and the non-volatile memory device 220 and the storage controller 210 may be connected through the plurality of channels CH1 to CHm. For example, the storage system 200 may be implemented as a storage system such as an SSD.

The non-volatile memory device 220 may include a plurality of non-volatile memory devices NVM11 to NVMmn. Each of the non-volatile memory devices NVM11 to NVMmn may be connected to one of the plurality of channels CH1 to CHm through a corresponding connection structure. In embodiments, the connection structure may be, for example, a way, or any other type of connection. For example, non-volatile memory devices NVM11 to NVM1$n$ may be connected to a first channel CH1 through connection structures W11 to W1$n$, and non-volatile memory devices NVM21 to NVM2$n$ may be connected to a second channel CH2 through connection structures W21 to W2$n$. In an example embodiment, each of the non-volatile memory devices NVM11 to NVMmn may be implemented in an arbitrary memory unit that may operate according to individual commands from the storage controller 210. For example, each of the non-volatile memory devices NVM11 to NVMmn may be implemented as a chip or a die, however embodiments are not limited thereto.

The storage controller 210 may transmit and receive signals to and from the non-volatile memory device 220 through the plurality of channels CH1 to CHm. For example, the storage controller 210 may transmit commands CMDa to CMDM, addresses ADDRa to ADDRm, and data DATAa to DATAm to the non-volatile memory device 220 through the channels CH1 to CHm, or may receive the data DATAa to DATAm from the non-volatile memory device 220.

The storage controller 210 may select one of the non-volatile memory devices connected to the channel through each channel, and transmit and receive signals to and from the selected non-volatile memory device. For example, the storage controller 210 may select the non-volatile memory device NVM11 among the non-volatile memory devices NVM11 to NVM1$n$ connected to a first channel CH1. The storage controller 210 may transmit command CMDa, address ADDRa, and data DATAa to the selected non-volatile memory device NVM11 through the first channel CH1 or may receive the data DATAa from the selected non-volatile memory device NVM11.

The storage controller 210 may transmit and receive signals in parallel to and from the non-volatile memory device 220 through different channels from each other. For example, the storage controller 210 may transmit a command CMDb to the non-volatile memory device 220 through a second channel CH2, while transmitting the command CMDa to the non-volatile memory device 220 through the first channel CH1. For example, the storage controller 210 may receive the data DATAb from the non-volatile memory device 220 through the second channel CH2, while receiving the data DATAa from the non-volatile memory device 220 through the first channel CH1.

The storage controller 210 may control the overall operation of the non-volatile memory device 220. The storage controller 210 may transmit the signal to the channels CH1 to CHm to control each of the non-volatile memory devices NVM11 to NVMmn connected to the channels CH1 to CHm. For example, the storage controller 210 may transmit the command CMDa and the address ADDRa to the first channel CH1 to control selected one among the non-volatile memory devices NVM11 to NVM1$n$.

Each of the non-volatile memory devices NVM11 to NVMmn may operate in accordance with the control of the storage controller 210. For example, the non-volatile memory device NVM11 may program the data DATAa in accordance with the command CMDa, the address ADDRa and the data DATAa provided to the first channel CH1. For example, the non-volatile memory device NVM21 may read the data DATAb in accordance with the command CMDb and the address ADDRb provided to the second channel CH2, and transmit the read data DATAb to the storage controller 210.

As illustrated in FIG. 3 the non-volatile memory device 220 communicates with the storage controller 210 through m channels, and the non-volatile memory device 220 includes n non-volatile memory devices to correspond to each channel, however the number of channels and the number of non-volatile memory devices connected to one channel may be variously changed. An example of a non-volatile memory device 220 may be explained more specifically through FIG. 4.

The non-volatile memory devices NVM11 to NVMmn may be referred to as non-volatile memory sets (NVM set) and may operate as an NVMe protocol. The NVMe is a host-to-memory control interface and storage protocol through a high-speed Peripheral Component Interconnect Express (PCIe) bus of a computer. The NVMe protocol may manage the non-volatile memory devices by dividing them into zones defined for each namespace. The namespace may be a zone divided by an ID and logically divided in the non-volatile memory device.

The NVM device may be sequentially stored in zones defined according to the application and the usage cycle, and may be erased in zone units. Further, according to some embodiments, the non-volatile memory device may allocate a certain portion of the total capacity to an OP (Over-Provisioning) region.

Data may be written sequentially within zones defined for each namespace. The zone may be defined by a start Logical Block Address (LBA) and a last LBA, and the zone for each namespace may be identified by the start LBA.

Figure 4:
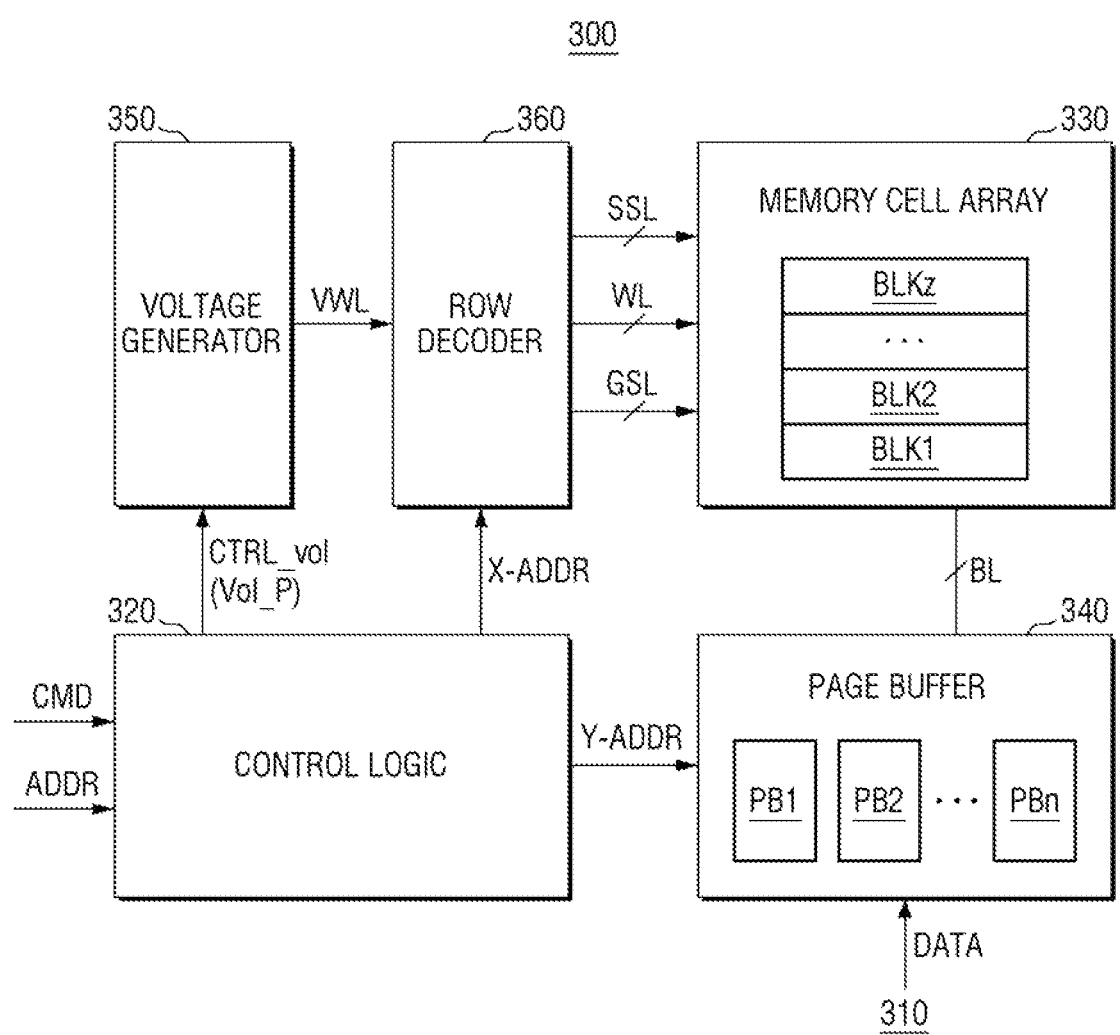
FIG. 4 is a block diagram that shows a non-volatile memory device, according to an embodiment.

FIG. 4 is a block diagram that shows a non-volatile memory device.

A non-volatile memory device 300 of FIG. 4 may be one of the non-volatile memory devices NVM11 to NVMmn of FIG. 3.

Referring to FIG. 4, a non-volatile memory device 300 may include a control logic circuit 320, a memory cell array 330, a page buffer 340, a voltage generator 350, and a row decoder 360. The non-volatile memory device 300 may further include a memory interface circuit 310, and may further include a column logic, a pre-decoder, a temperature sensor, a command decoder, an address decoder, and the like.

The control logic circuit 320 may generally control various operations inside the non-volatile memory device 300. The control logic circuit 320 may output various control signals in response to the command CMD and/or the address ADDR from the memory interface circuit 310. For example, the control logic circuit 320 may output a voltage control signal CTRL_vol, a row address X-ADDR, and a column address Y-ADDR.

The memory cell array 330 may include a plurality of memory blocks BLK1 to BLKz (where z is a positive integer), and each of the plurality of memory blocks BLK1 to BLKz may include a plurality of memory cells. The memory cell array 330 may be connected to the page buffer 340 through the bit lines BL, and may be connected to the row decoder 360 through word lines WL, string selection lines SSL, and ground selection lines GSL.

In an example embodiment, the memory cell array 330 may include a three-dimensional memory cell array, and the three-dimensional memory cell array may include a plurality of NAND strings. Each NAND string may include memory cells which are each connected to word lines stacked vertically on the substrate. The disclosures of U.S. Pat. Nos. 7,679,133, 8,553,466, 8,654,587, 8,559,235, and U.S. Patent Application Publication No. 2011/0233648 are incorporated by reference herein in their entireties. In an example embodiment, the memory cell array 330 may include a two-dimensional memory cell array, and the two-dimensional memory cell array may include a plurality of NAND strings placed along row and column directions.

According to some embodiments, the memory cell array 330 may include a protected region and an unprotected region. The protected region is a region which may be set according to the permanent write protection command, and in which the permanent data is stored, and the unprotected region may be a region other than the protected region, in which permanent write protection is not performed. According to some embodiments, the protected region and the unprotected region are physically separated regions, and the protected region may not be affected by data access to the unprotected region (for example, write or erase operation). Therefore, the protected region may have better retention characteristics than the unprotected region.

The page buffer 340 may include a plurality of page buffers PB1 to PBn (where n is an integer of 3 or more), and each of the plurality of page buffers PB1 to PBn may be connected to the memory cells through a plurality of bit lines BL. The page buffer 340 may select at least one bit line among the bit lines BL in response to the column address Y-ADDR. The page buffer 340 may operate as a write driver or a sense amplifier, depending on the operating mode. For example, at the time of a program operation, the page buffer 340 may apply a bit line voltage corresponding to the data to be programmed to the selected bit line. At the time of a read operation, the page buffer 340 may sense the current or voltage of the selected bit line to sense the data stored in the memory cell.

The voltage generator 350 may generate various types of voltages for performing the program, read, and erase operations on the basis of the voltage control signal CTRL_vol. For example, the voltage generator 350 may generate a program voltage, a read voltage, a program verification voltage, an erase voltage, and the like, as a word line voltage VWL.

The row decoder 360 may select one of a plurality of word lines WL, and may select one of a plurality of string selection lines SSL, in response to the row address X-ADDR. For example, the row decoder 360 may apply the program voltage and the program verification voltage to the selected word line at the time of the program operation, and may apply the read voltage to the selected word line at the time of the read operation.

Figure 5:
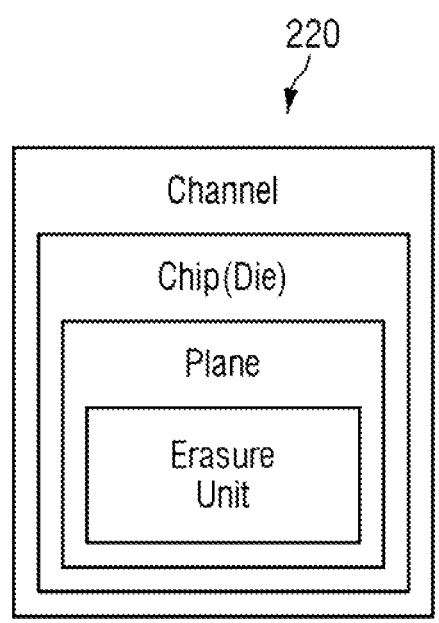
FIG. 5 is a conceptual diagram in which the non-volatile memory device is divided into data access units, according to an embodiment.

FIG. 5 is a conceptual diagram in which the non-volatile memory device according to some embodiments is divided into data access units.

Referring to FIG. 5, the non-volatile memory device 220 may be connected to the channel through the connection structures W21 to W2n of FIG. 3. A plurality of non-volatile memory devices connected to one channel may be placed on at least one chip (or die). A non-volatile memory device in a single chip includes a plurality of planes, and each plane includes a plurality of unit blocks. Since the erase operation is performed in block units, the block may be regarded as an erase unit.

The storage controller 210 may calculate the at least one metric in units of the chip, die, plane, or block on the namespace check module 215a according to some embodiments. In addition, the migration selection module 215b may set the protected region based on the calculated metric. The protected region may be a region in which the write protection is set by being physically separated according to any unit among the chip, die, plane or block unit according to some embodiments.

Figure 6:
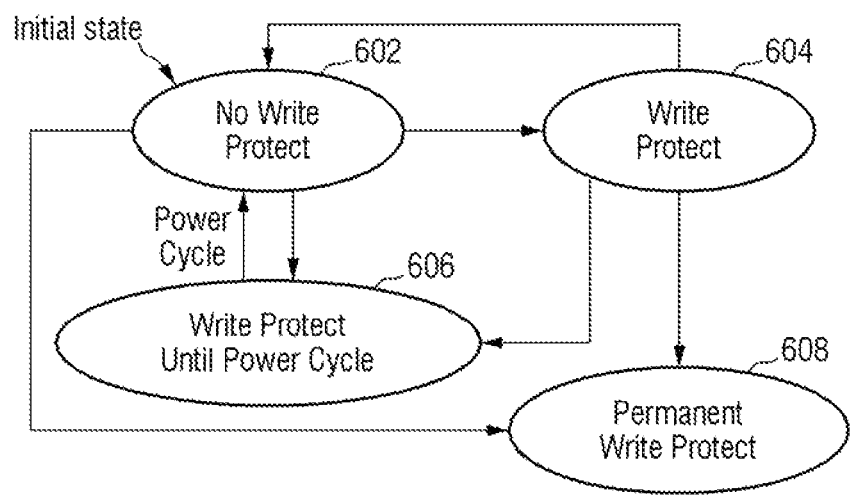
FIG. 6 is a conceptual diagram for explaining the write protection command of the storage system according to an embodiments.

FIG. 6 is a conceptual diagram for explaining the write protection command of the storage system according to some embodiments, FIG. 7 is a table for explaining the write protection command of the storage system according to some embodiments, and FIG. 8 is a table for explaining a configuration of the write protection command of a storage system according to some embodiments.

Referring to FIGS. 6 to 8, the namespace write operation may include a plurality of limit states. The storage controller 210 may select one of a plurality of limit states under the control of the host to limit the write operation inside the zone for each namespace.

The plurality of limit states include a write non-protection state 602, a write protection state 604, a write protection state during power cycle 606, and a permanent write protection state 608.

Referring to FIG. 6, the initial state is set to the write protection state 602. Switching between each state is based on the function setting command, for example the Set Features command. Referring to FIG. 7, except for the write protection state during the power cycle, the remaining limit states persist during the power cycle and storage controller level reset. Referring to FIG. 8, the host 100 may select one of a plurality of limit states based on at least two bits to limit write operations within the zone for each namespace. For example, the storage controller 210 may include 011b corresponding to the permanent write protection state in the function setting command, and transmit it to the non-volatile memory device 220.

Figure 9:
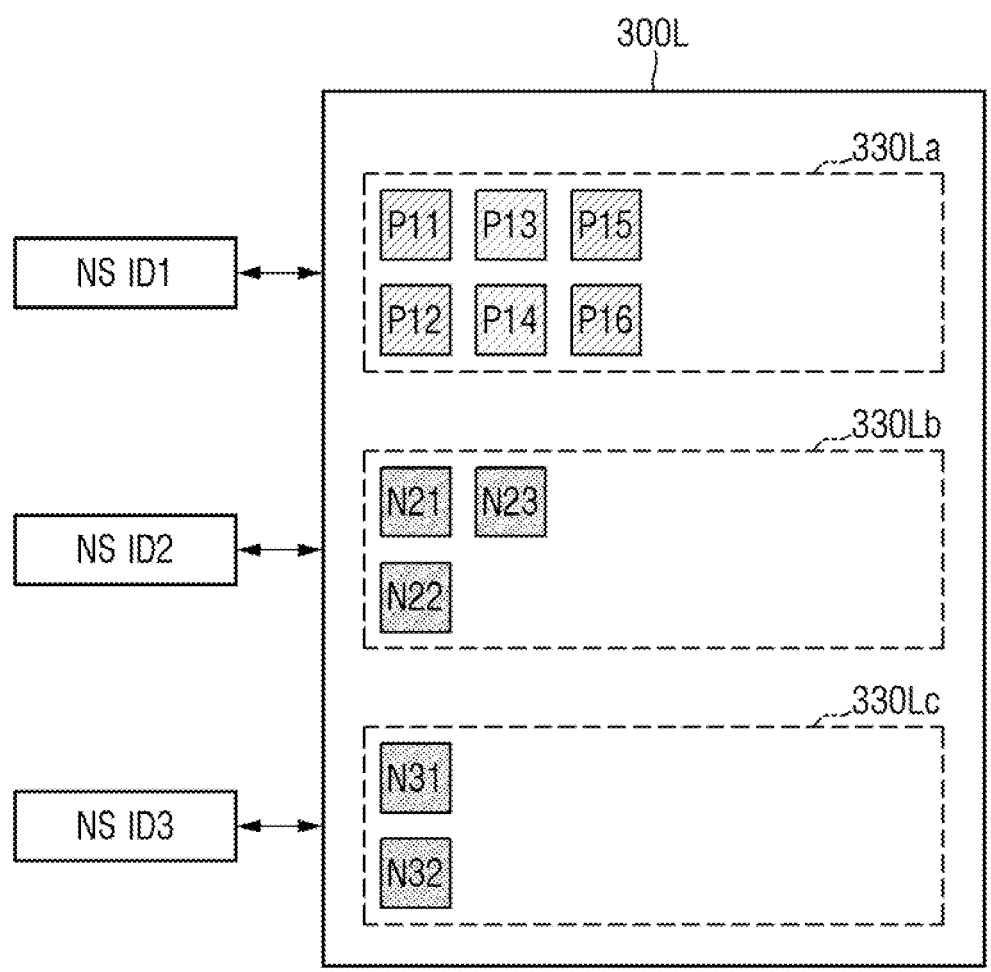
FIGS. 9 and 10 are conceptual diagrams for explaining the operating method of the storage system according to an embodiment.
Figure 10:
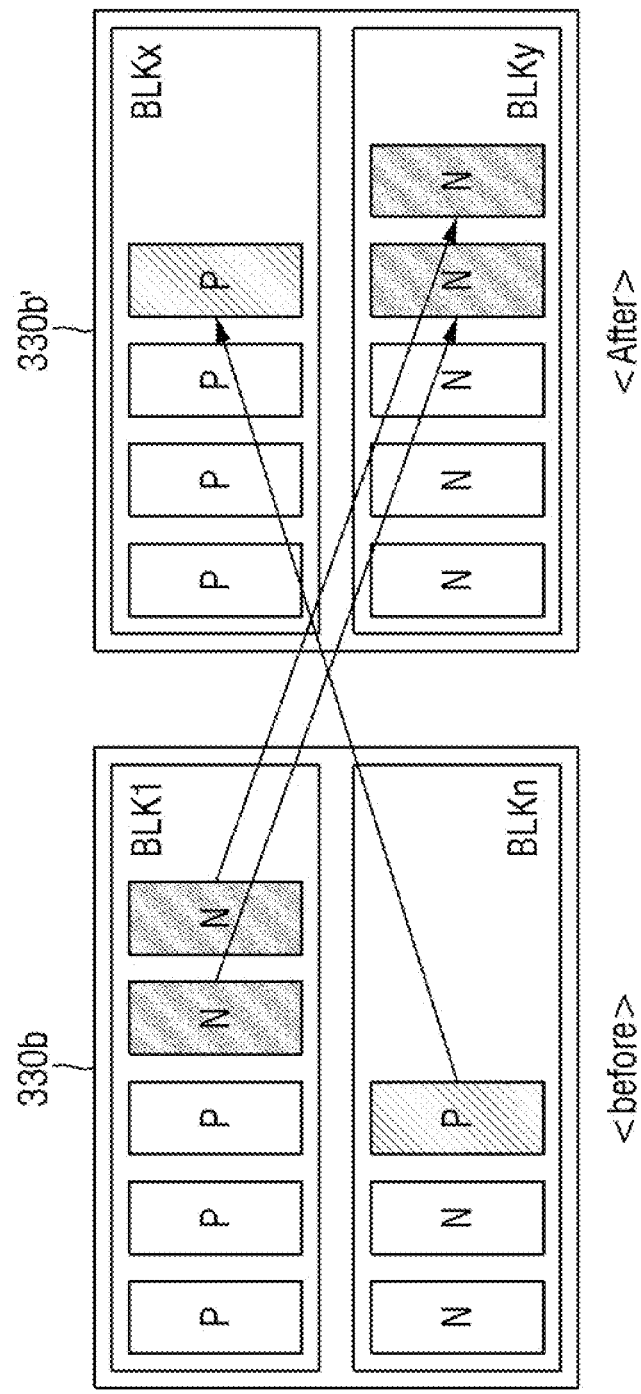

FIGS. 9 and 10 are conceptual diagrams for explaining the operating method of the storage system according to some embodiments.

Referring to FIGS. 5, 9 and 10, in a non-volatile memory device 300L, a zone logically divided according to the namespace ID is set, and data having the same namespace ID are written in the set zone. For example, data assigned to ID1 may be written in a first zone 330La defined to correspond to the first namespace NS ID1. Data assigned to ID2 may be written in a second zone 330Lb defined to correspond to the second namespace NS ID2. Data assigned to ID3 may be written in a third zone 330Lc defined to correspond to the third namespace NS ID3.

According to some embodiments, the first zone 330La, the second zone 330Lb, and the third zone 330Lc may include data divided by different namespace IDs from each other. Data P11, P12, P13, P14, P15, and P16 having the namespace NS ID1 may be stored in the first zone 330La. Data N21, N22, and N23 having the namespace NS ID2 may be stored in the second zone 330Lb. Data N31 and N32 having the namespace NS ID3 may be stored in the third zone 330Lc.

The first zone 330La, the second zone 330Lb, and the third zone 330Lc may be zones divided as logical addresses, but may be physically included in one non-volatile memory region 300L. That is, data having different namespace IDs may be stored in one physical region in a mixed manner.

If a permanent write protection command with the namespace NS ID1 as the target namespace is received, the data P belonging to the namespace NS ID1 is continuously preserved. However, the write or erase operation may be performed on the region of the namespace NS ID2 or NS ID3 and the data N.

If data P and data N coexist in the physically same memory region, when programming or erasing the data N (for example, NS ID2 or NS ID3) that has a namespace ID different from the target namespace, data of the namespace NS ID1 existing in the same memory region may also be indirectly affected. For example, in this scenario data of the namespace NS ID1 may be inadvertently deleted, deteriorated, or otherwise changed.

Referring to FIG. 10, the non-volatile memory device 300 according to some embodiments may migrate data having a target namespace ID subject to a permanent write protection command to a physically independent memory region. As illustrated in FIG. 10, the data having the target namespace NS ID1 is labeled as P, and the data of the remaining other namespaces NS ID2 and NS ID3 is labeled as N.

The data P and the data N may physically coexist in the same memory region as shown in arrangement 330b of FIG. 10. For example, the data P and data N may coexist in the first memory block BLK1, and the data N and data P may coexist in an $n^{th}$ memory block BLKn.

When the permanent write protection command is received for the namespace NS ID1, the storage controller 210 sets a physically independent memory region BLKx as the protected region, as shown in arrangement 330b' (after) of FIG. 10, and may migrate the data P of the target namespace NS ID1 to the protected memory region BLKx, and may migrate the data N which is not included in the target namespace NS ID1 to the unprotected memory region BLKy. The changed mapping information is managed by the FTL 214.

A protected memory region BLKx may be a memory region in which the retention characteristic is superior to an unprotected memory region BLKy. The protected memory region and the unprotected memory region may be regions which are physically independent regions from each other. Referring to FIGS. 3 and 5 together, a region being physically independent may mean a region in which any of a block, a channel, or a connection structure is different from another memory region. For example, two memory regions which are physically independent from each other may be placed in different blocks (i.e., in erase units) according to some embodiments, may be non-volatile memory devices connected to different channels according to some embodiments, may be non-volatile memory devices placed on different dies according to some embodiments, or may be non-volatile memory devices connected to different connection structures according to some embodiments.

According to some embodiments, the data stored in the protected region BLKx, for example the data having the target namespace ID of target namespace NS ID1, and which may be illustrated as data P, may be written to a memory cell at a different level from the data stored in the unprotected region BLKy, for example the data N discussed above. For example, the data N may be written to the unprotected memory region BLKy in a triple level cell (TLC) or quad level cell (QLC) manner, and the data P may be written in the protected memory region BLKx in a single level cell or multi-level cell manner.

For example, when the data P with the target namespace ID of target namespace NS ID1 is written in a triple level cell (TLC) or quad level cell (QLC) manner, the storage controller 210 may write the data P in a single level cell or multi-level cell manner again. In this case, since the data P of the namespace NS ID1 is written in a level cell manner lower than the data of the namespace NS ID2 and NS ID3, the data of the namespace NS ID1 may be subjected to a degree of deterioration due the write operation which is reduced as compared to that of the data of the namespace NS ID2.

However, in the above embodiment, when the write method of the data P is changed to a level cell method lower than the currently written level for migration, the storage controller may use a part of the Over Provisioning (OP) region. When changing to the low level cell method for migration, because the actual data capacity is reduced, the OP region setting may be changed to compensate for this and utilized for the data P migration.

Figure 11A:
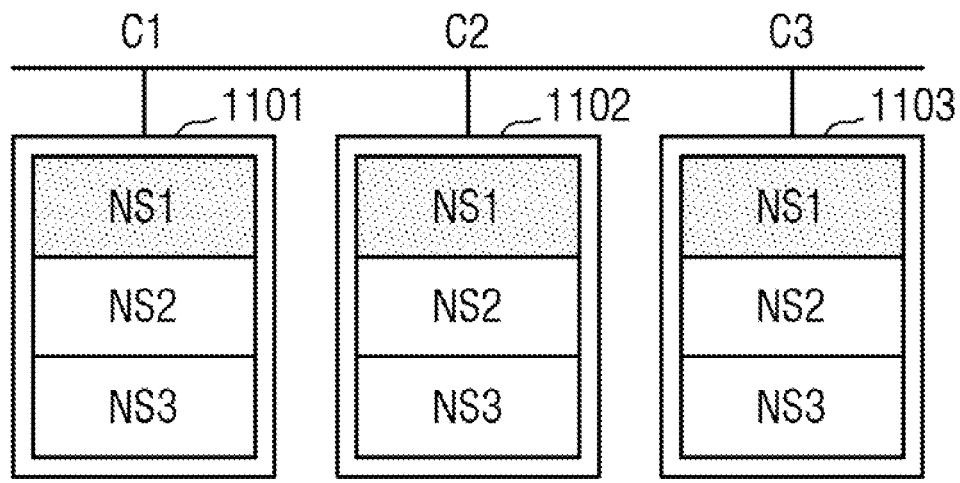
FIGS. 11a and 11b are conceptual diagrams for explaining the operating method of the storage system according to an embodiment.
Figure 11B:
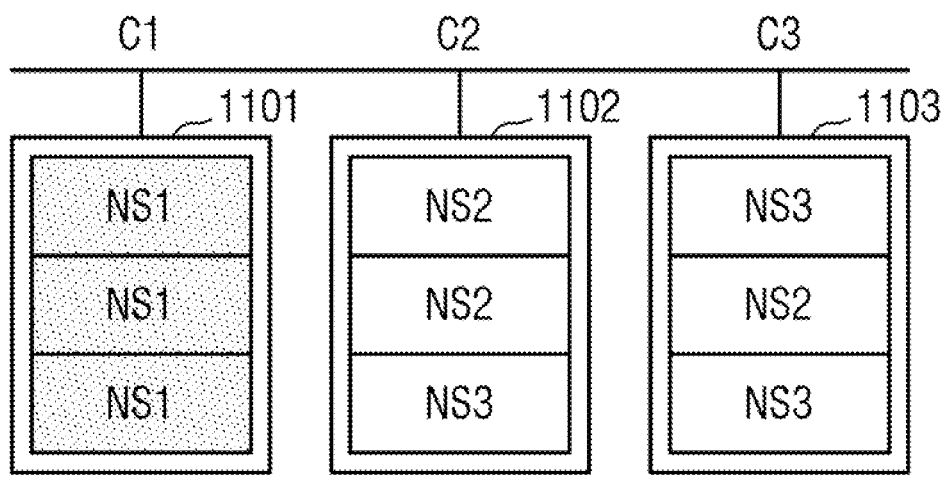

FIGS. 11a and 11b are conceptual diagrams for explaining the operating method of the storage system according to some embodiments. For convenience of explanation, NS1, NS2, and NS3 may be data having different namespace IDs, NS1 may be a namespace in which a permanent write protection is set, and NS2 and NS3 may be namespaces in which a permanent write protection is not set. The data may be stored in the non-volatile memory device 300 belonging to the same connection structure, or may be stored in the non-volatile memory device 300 belonging to different connection structures C1, C2 and C3.

Referring to FIG. 11a, the first non-volatile memory device 1101 belonging to the first connection structure C1 according to some embodiments stores the first data of NS1, the second data of NS2, and the third data of NS3 in accordance with the FTL policy. The second non-volatile memory device 1102 belonging to the second connection structure C2 stores the first data of NS1, the second data of NS2, and the third data of NS3 in accordance with the FTL policy. The third non-volatile memory device 1103 belonging to the third connection structure C3 stores the first data of NS1, the second data of NS2, and the third data of NS3 in accordance with the FTL policy.

For example, when an access operation (for example a read operation, a write operation, an erase operation, etc.) of the second data NS2 is performed in the first non-volatile memory device 1101, since the first data NS1 is stored together in a region (for example the first non-volatile memory device 1101) that is not physically independent of the second data, the access operation may function as a deterioration condition of the first data.

Referring to FIG. 11b, according to some embodiments, the storage controller calculates the retention characteristics based on the at least one metric of each non-volatile memory device, and sets the non-volatile memory device having the maximum retention characteristic in terms of physical address to a protected region. In the shown example, it is assumed that the first non-volatile memory device 1101 of the first connection structure C1 is determined to have the maximum retention characteristic and is set as the protected region. The storage controller migrates all the first data of the namespace NS1 in which the permanent write protection is set to the protected region (for example the first non-volatile memory device 1101), and migrates the data of other namespaces NS2 and NS3 that are in the first non-volatile memory device 1101 of the first connection structure C1 to the second non-volatile memory device 1102 of the connection structure C2 and the third non-volatile memory device 1103 of the connection structure C3.

In this case, because the first non-volatile memory device 1101, the second non-volatile memory device 1103, and the third non-volatile memory device 1103 are connected to different connection structures, even when a read operation, a write operation, an erase operation, and the like are performed on any one data in a $k^{th}$ volatile memory device of any one connection structure Ck (where k is an arbitrary natural number), the data of the non-volatile memory devices of the physically separated remaining connection structures are less likely to be deteriorated.

According to some embodiments, the first non-volatile memory device 1101 of the first connection structure C1 may include not only the data of the target namespace NS1 but also the error correction information of the data. The error correction information may be parity data subjected to XOR computation by adding the data of the target namespace NS1 to the protection information (for example, an error correction code or the like) according to some embodiments, or may be an eraser cord generated by error coding according to some embodiments.

When the retention characteristics of the non-volatile memory device and the characteristics of the namespace (whether the write protection is performed) are divided and migrated to the appropriate position, the data retention characteristics of the namespace NS1 with the permanent write protection set may be maintained stably.

Figure 12:
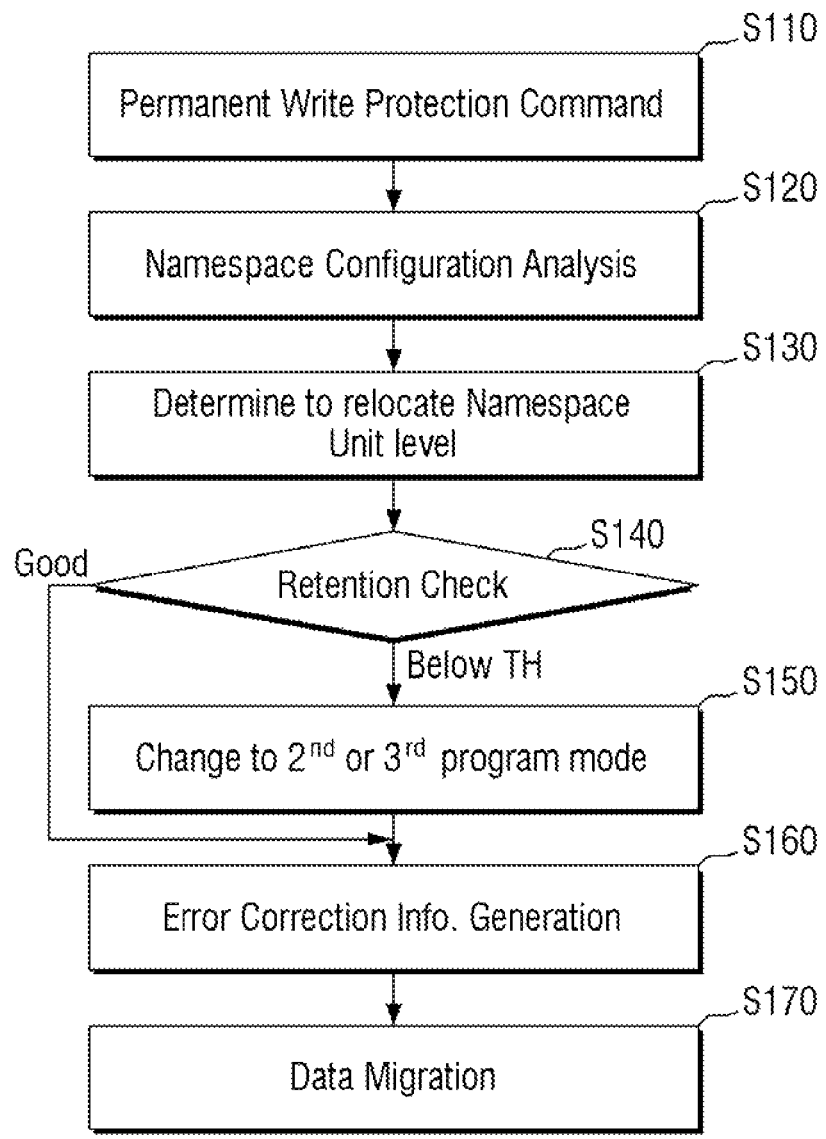
FIG. 12 is a flowchart for explaining an operating method of the storage system according to an embodiment.

FIG. 12 is a flowchart for explaining an operating method of the storage system according to some embodiments.

Referring to FIG. 12, when the storage system receives the permanent write protection command at operation S110, the data distribution of the zone defined for each namespace in the non-volatile memory device and the namespace corresponding to the command (hereinafter referred to as the target namespace) is confirmed at operation S120, for example using a namespace configuration analysis.

The storage system calculates the retention characteristic of each non-volatile memory device based on the at least one metric of the non-volatile memory device 300, sets a region having a strong retention characteristic as a protected region, and determines to relocate a namespace corresponding to the permanent write protection command at operation S130. The region having the strong retention characteristic may be a physically independent region according to some embodiments.

The data in which the permanent write protection of the target namespace is set may have different write methods depending on the retention characteristics. At operation S140, the retention characteristics may be checked. For example, when the data in which the permanent write protection of the target namespace is set has excellent retention characteristics (Good at operation S140), after the error correction information for the data is additionally generated at operation S160, the data and the generated error correction information are migrated to the protected region at operation S170. When the data in which the permanent write protection of the target namespace is set has weak retention characteristics, for example when the retention characteristics are below a predetermined threshold (Below TH at operation S140), the write method is changed (for example, changed to a level cell method lower than the current level) to enhance the data retention characteristics at operation S150. For example, when the data is written by the triple level cell method, the data is written by the double level cell method or the single level cell method. According to some embodiments, error correction information is additionally generated at operation S160 for the data written by the changed method and migrated to the protected region at operation S170. The error correction information may be parity data subjected to XOR computation by adding the data of the target namespace to the protection information (for example, an error correction code), or may be an erasure code generated by the erasure coding according to some embodiments. According to some embodiments, it is possible to migrate the data written in the modified method to the protected region, without generating error correction information (for example without going through operation S160) at operation S170.

Figure 13:
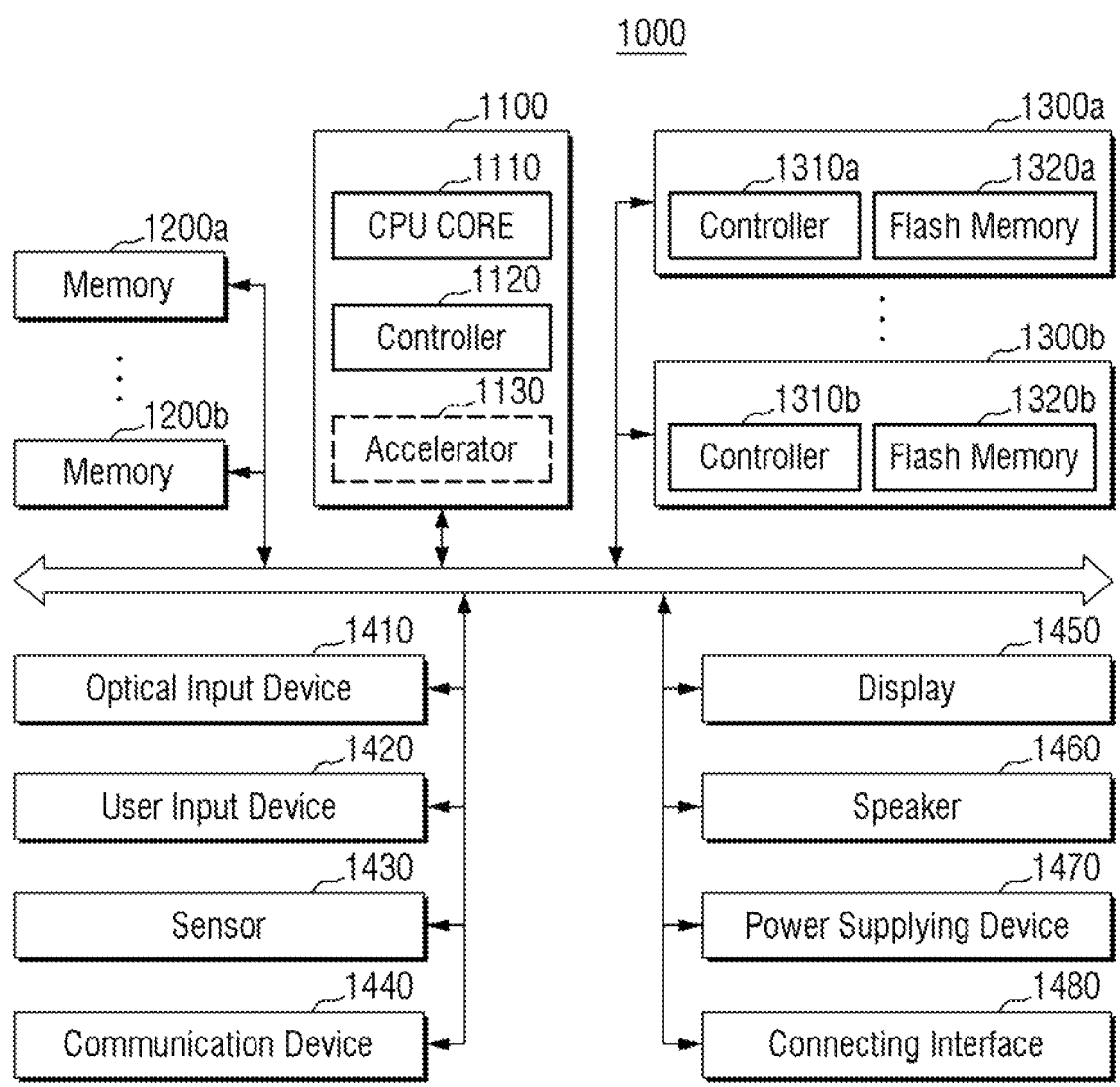
FIG. 13 is a block diagram for explaining an electronic system, according to an embodiment.

FIG. 13 is a block diagram for explaining an electronic system to which the operation of the storage system according to some embodiments is applied. An electronic system 1000 of FIG. 13 may be basically a mobile system, such as a mobile phone, a smart phone, a tablet personal computer (PC), a wearable device, a healthcare device or an internet of things (IOT) device. However, the electronic system 1000 of FIG. 1 is not necessarily limited to the mobile system, but may also be a personal computer, a laptop computer, a server, a media player or an automotive device such as navigation.

Referring to FIG. 13, the electronic system 1000 may include a main processor 1100, memories 1200a and 1200b, and storage devices 1300a and 1300b, and may additionally include one or more of an image capturing device 1410, a user input device 1420, a sensor 1430, a communication device 1440, a display 1450, a speaker 1460, a power supplying device 1470, and a connecting interface 1480.

The main processor 1100 may control the overall operations of the electronic system 1000, more specifically, the operations of other constituent elements that make up the electronic system 1000. Such a main processor 1100 may be implemented as a general-purpose processor, a dedicated processor, an application processor, or the like.

The main processor 1100 may include one or more CPU cores 1110, and may further include a controller 1120 for controlling the memories 1200a and 1200b and/or the storage devices 1300a and 1300b. Depending on the embodiments, the main processor 1100 may further include an accelerator block 1130, which is a dedicated circuit for a high-speed data computation such as an artificial intelligence (AI) data computation. Such an accelerator block 1130 may include a Graphics Processing Unit (GPU), A Neural Processing Unit (NPU) and/or a Data Processing Unit (DPU), and the like, and may be implemented as separate chips that are physically independent of other constituent elements of the main processor 1100.

The memories 1200a and 1200b may be used as a main memory unit of the electronic system 1000, and may include a volatile memory such as an SRAM and/or a DRAM, but may also include a non-volatile memory such as a flash memory, a PRAM and/or a RRAM. The memories 1200a and 1200b may also be implemented inside the same package as the main processor 1100.

The storage devices 1300a and 1300b may function as non-volatile storage devices that store data regardless of whether a power is supplied, and may have a relatively larger storage capacity than the memories 1200a and 1200b. The storage devices 1300a and 1300b may include storage controllers 1310a and 1310b, and NVM storages 1320a and 1320b that store data under the control of the storage controllers 1310a and 1310b. The non-volatile storages 1320a and 1320b may include a flash memory of a 2D structure or a 3D VNAND structure, but may also include other types of non-volatile memories such as a PRAM and/or a RRAM.

The storage devices 1300a and 1300b may be included in the electronic system 1000 in a state of being physically separated from the main processor 1100, and may be implemented in the same package as the main processor 1100. Further, since the storage devices 1300a and 1300b have a shape such as an SSD or a memory card, the storage devices 1300a and 1300b may also be detachably coupled with other constituent elements of the electronic system 1000 through an interface such as a connecting interface 1480 to be described below. Such storage devices 1300a and 1300b may be, but are not necessarily limited to, devices to which standard protocols such as a UFS, an eMMC, or an NVMe are applied.

The image capturing device 1410 may capture still images or moving images, and may be a camera, a camcorder, and/or a webcam and the like.

The user input device 1420 may receive various types of data that are input from users of the electronic system 1000, and may be a touch pad, a key pad, a keyboard, a mouse and/or a microphone.

The sensor 1430 may detect various types of physical quantities that may be acquired from the outside of the electronic system 1000, and convert the detected physical quantities into electrical signals. Such a sensor 1430 may be a temperature sensor, a pressure sensor, an illuminance sensor, a position sensor, an acceleration sensor, a biosensor and/or a gyroscope sensor.

The communication device 1440 may transmit and receive signals to and from other devices outside the electronic system 1000 according to various communication protocols. Such a communication device 1440 may be implemented to include an antenna, a transceiver and/or a modem and the like.

The display 1450 and the speaker 1460 may each function as output devices that output visual and auditory information to the user of the electronic system 1000.

The power supplying device 1470 may appropriately convert the power supplied from a battery equipped in the electronic system 1000 and/or an external power supply and supply the power to each constituent element of the electronic system 1000.

The connecting interface 1480 may provide a connection between the electronic system 1000 and an external device that may be connected to the electronic system 1000 to transmit and receive data to and from the electronic system 1000. The connecting interface 1480 may be implemented in various interface types, such as an Advanced Technology Attachment (ATA), a SATA, an external SATA (e-SATA), a Small Computer Small Interface (SCSI), a Serial Attached SCSI (SAS), a Peripheral Component Interconnection (PCI), a PCIe, an NVMe, an IEEE 1394, a universal serial bus (USB), a secure digital (SD) card, a multi-media card (MMC), an embedded multi-media card (eMMC), a Universal Flash Storage (UFS), an embedded Universal Flash Storage (eUFS), and a compact flash (CF) card interface.

Figure 14:
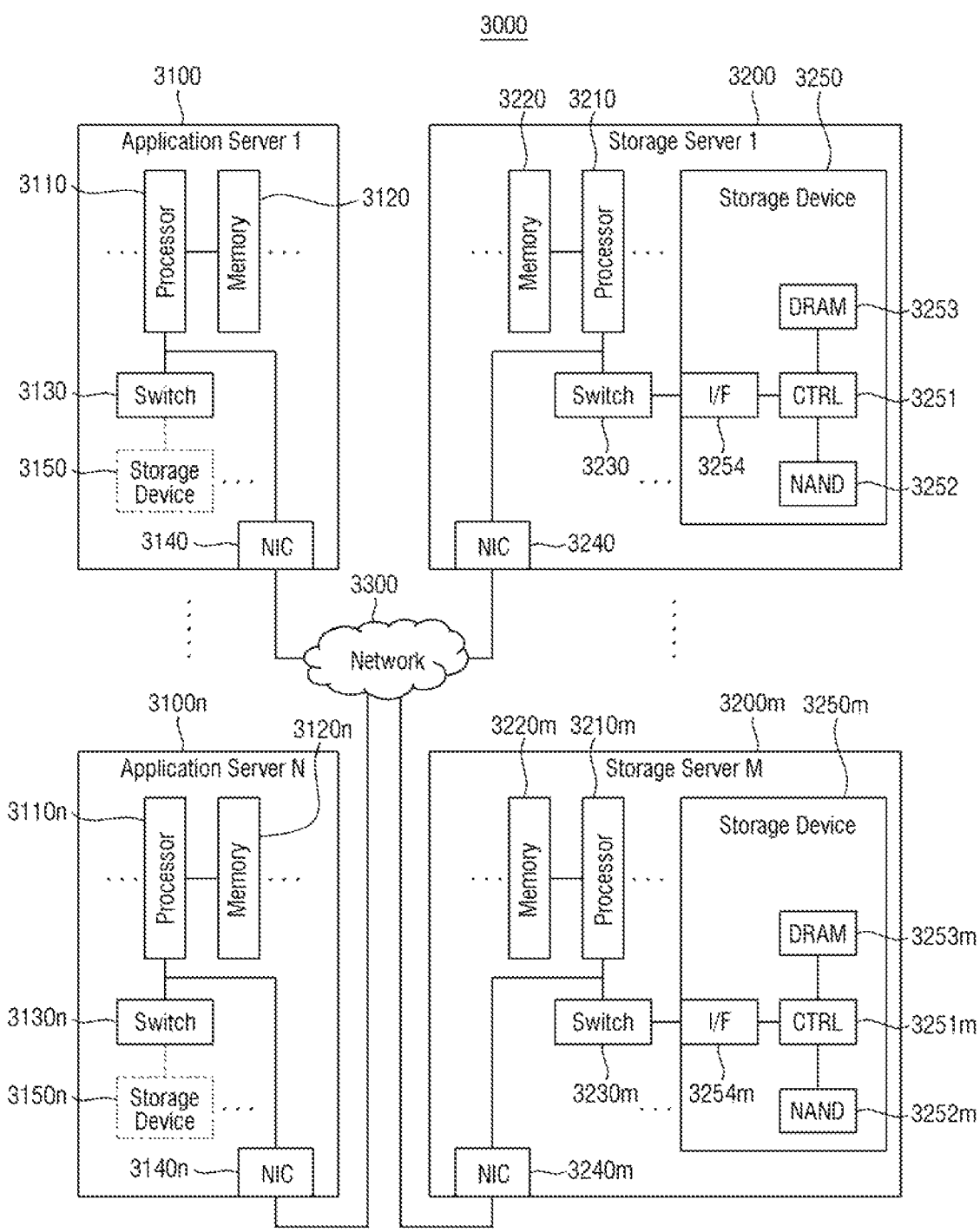
FIG. 14 is a diagram which shows a data center to which the memory device according to an embodiment of the present invention is applied.

FIG. 14 is a diagram which shows a data center to which the memory device according to an embodiment is applied.

Referring to FIG. 14, a data center 3000 is a facility that gathers various types of data and provides services, and may also be called a data storage center. The data center 3000 may be a system for search engine and database operation, and may be a computing system used by corporations such as banks or government agencies. The data center 3000 may include application servers 3100 to 3100n and storage servers 3200 to 3200m. The number of application servers 3100 to 3100n and the number of storage servers 3200 to 3200m may be variously selected depending on the embodiments, and the number of application servers 3100 to 3100n and the number of storage servers 3200 to 3200m may be different from each other.

The application server 3100 or the storage server 3200 may include at least one of processors 3110 and 3210 and memories 3120 and 3220. The storage server 3200 will be described as an example. The processor 3210 may control the overall operation of the storage server 3200, and may access the memory 3220 to execute command and/or data loaded into the memory 3220. The memory 3220 may be a DDR SDRAM (Double Data Rate Synchronous DRAM), a HBM (High Bandwidth Memory), a HMC (Hybrid Memory Cube), a DIMM (Dual In-line Memory Module), an Optane DIMM or a NVMDIMM (Non-Volatile DIMM). According to the embodiment, the number of processors 3210 and the number of memories 3220 included in the storage server 3200 may be variously selected. In an embodiment, the processor 3210 and the memory 3220 may provide a processor-memory pair. In an embodiment, the number of processors 3210 and memories 3220 may be different from each other. The processor 3210 may include a single core processor or a multi-core processor. The aforementioned explanation of the storage server 3200 may also be similarly applied to the application server 3100. According to the embodiments, the application server 3100 may not include a storage device 3150. The storage server 3200 may include at least one or more storage devices 3250. The number of storage devices 3250 included in the storage server 3200 may be variously selected depending on the embodiments.

The application servers 3100 to 3100n and the storage servers 3200 to 3200m may communicate with each other through a network 3300. The network 3300 may be implemented, using a Fibre Channel (FC), an Ethernet, or the like. In embodiments, FC may be a medium used for a relatively high-speed data transfer, and may use an optical switch that provides high performance/high availability. The storage servers 3200 to 3200m may be provided as a file storage, a block storage or an object storage, depending on the access type of the network 3300.

In an embodiment, the network 1300 may be a storage-only network such as a Storage Area Network (SAN). For example, a SAN may be an FC-SAN which uses an FC network and is implemented according to FC Protocol (FCP). As another example, a SAN may be an IP-SAN which uses a TCP/IP network and is implemented according to a SCSI over TCP/IP or Internet SCSI (iSCSI) protocol. In another embodiment, the network 1300 may be a general network such as a TCP/IP network. For example, the network 1300 may be implemented, according to protocols such as an FC over Ethernet (FCOE), a Network Attached Storage (NAS), and an NVMe over Fabrics (NVMe-oF).

Hereinafter, the application server 3100 and the storage server 3200 will be mainly described. Explanation of the application server 3100 may also be applied to another application server 3100n, and explanation of the storage server 3200 may also be applied to another storage server 3200m.

The application server 3100 may store the data requested to store by a user or client in one of the storage servers 3200 to 3200m through the network 3300. Further, the application server 3100 may acquire the data requested to read by the user or client from one of the storage servers 3200 to 3200m through the network 3300. For example, the application server 3100 may be implemented as a Web server, a DBMS (Database Management System) or the like.

The application server 3100 may access a memory 3120n or a storage device 3150n included in another application server 3100n through the network 3300, or may access the memories 3220 to 3220m or the storage devices 3250 to 3250m included in the storage servers 3200 to 3200m through the network 3300. Accordingly, the application server 3100 may perform various operations on the data stored in the application servers 3100 to 3100n and/or the storage servers 3200 to 3200m. For example, the application server 3100 may execute commands for moving or copying the data between the application servers 3100 to 3100n and/or the storage servers 3200 to 3200m. In embodiments, the data may be moved from the storage devices 3250 to 3250m of the storage servers 3200 to 3200m via the memories 3220 to 3220m of the storage servers 3200 to 3200m, or may be directly moved to the memories 3120 to 3120n of the application servers 3100 to 3100n. Data which moves through the network 3300 may be data encrypted for security and privacy.

Taking the storage server 3200 as an example, an interface 3254 may provide a physical connection between the processor 3210 and a controller 3251, and a physical connection between the NIC 3240 and the controller 3251. For example, the interface 3254 may be implemented in a DAS (Direct Attached Storage) manner in which the storage device 3250 is directly connected with a dedicated cable. Further, for example, the interface 3254 may be implemented in various interface types, such as an ATA, a SATA, an e-SATA, a SCSI, a SAS, a PCI, a PCIe, an NVMe, an IEEE 1394, a USB, an SD card, a MMC, an eMMC, a UFS, an eUFS), and a CF card interface.

The storage server 3200 may further include a switch 3230 and a NIC 3240. The switch 3230 may selectively connect the processor 3210 and the storage device 3250 or may selectively connect the NIC 3240 and the storage device 3250, according to the control of the processor 3210.

In an embodiment, the NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a DSP, a host bus interface, or the like, and may be connected to the processor 3210 and/or the switch 3230, or the like through the host bus interface. The host bus interface may also be implemented as one of the examples of the interface 3254 described above. In an embodiment, the NIC 3240 may also be integrated with at least one of the processor 3210, the switch 3230, and the storage device 3250.

In the storage servers 3200 to 3200m or the application servers 3100 to 3100n, the processor may transmit the commands to the storage devices 3150 to 3150n and 3250 to 3250m or the memories 3120 to 3120n and 3220 to 3220m to program or read the data. In embodiments, the data may be data in which an error is corrected through an ECC engine. The data is data subjected to data bus inversion (DBI) or data masking (DM) process, and may include Cyclic Redundancy Code (CRC) information. The data may be data that is encrypted for security and privacy.

The storage devices 3150 to 3150m and 3250 to 3250m may transmit the control signal and command/address signal to the NAND flash memory devices 3252 to 3252m in response to the read command received from the processor. Accordingly, when data is read from the NAND flash memory devices 3252 to 3252m, the Read Enable (RE) signal is input as a data output control signal, and may serve to output the data to the DQ bus. A Data Strobe (DQS) may be generated, using the RE signal. Commands and address signals may be latched to the page buffer, depending on a rising edge or a falling edge of a Write Enable (WE) signal.

The controller 3251 may generally control the operation of the storage device 3250. In an embodiment, the controller 3251 may include a Static Random Access Memory (SRAM). The controller 3251 may write data in the NAND flash 3252 in response to a write command, or may read the data from the NAND flash 3252 in response to a read command. For example, the write command and/or the read command may be provided from the processor 3210 in the storage server 3200, a processor 3210m in another storage server 3200m or the processors 3110 and 3110n in the application servers 3100 and 3100n. A DRAM 3253 may temporarily store or buffer the data to be written in the NAND flash 3252 or the data read from the NAND flash 3252. Also, the DRAM 3253 may store metadata. Here, the metadata is a user data or data generated by the controller 3251 to manage the NAND flash 3252. The storage device 3250 may include an Secure Element (SE) for security and privacy.

In concluding the detailed description, those skilled in the art will appreciate that many variations and modifications may be made to embodiments described herein without substantially departing from the principles of the disclosure. Therefore, the embodiments discussed herein are used in a generic and descriptive sense only, and not for purposes of limitation.

What is claimed is:

1. An operating method of a storage controller, the operating method comprising:
   receiving a permanent write protection command;
   checking a distribution of first data included in a target namespace corresponding to the permanent write protection command;
   setting at least one memory region as a protected memory region, based on at least one metric corresponding to each of a plurality of non-volatile memory devices; and
   based on the protected memory region being set:
      migrating the first data, which is stored in a remaining memory region different from the protected memory region, to the protected memory region, and
      migrating second data included in a second namespace and stored in the protected memory region to a remaining memory region different from the protected memory region.

2. The operating method of the storage controller of claim 1, wherein the protected memory region is physically independent from the remaining memory region.

3. The operating method of the storage controller of claim 2, wherein at least one of a block, a channel, a connection structure, a chip, or a die corresponding to the protected memory region is independent from at least one of a block, a channel, a connection structure, a chip, or a die corresponding to the remaining memory region.

4. The operating method of the storage controller of claim 1, wherein the at least one metric includes at least one of a Program/Erase (P/E) cycle, a read count, a temperature, a block position or a usage time associated with the plurality of non-volatile memory devices.

5. The operating method of the storage controller of claim 4, wherein the at least one memory region is set as the protected memory region based on the at least one metric indicating that the at least one memory region has better retention characteristics than the remaining memory region.

6. The operating method of the storage controller of claim 5, wherein based on the migrating, the first data is written in the protected memory region in a level cell manner which is lower than a current level cell manner of the first data based on retention characteristics of the first data.

7. The operating method of the storage controller of claim 1, wherein the protected memory region stores the first data and additional error correction information of the first data.

8. The operating method of the storage controller of claim 7, wherein the additional error correction information comprises parity data generated by performing an XOR computation on the first data.

9. The operating method of the storage controller of claim 1, wherein the first data is written in a single-level cell manner or a multi-level cell manner, and the second data is written in a triple-level cell manner or a quad-level cell manner.

10. The operating method of the storage controller of claim 9, wherein the first data written in the single-level cell manner or the multi-level cell manner utilizes a part of an Over Provisioning (OP) region of a non-volatile memory device corresponding to the protected memory region from among the plurality of non-volatile memory devices.

11. The storage device of claim 1, wherein the protected memory region is physically independent from the remaining memory region.

12. The storage device of claim 1, wherein the remaining memory region is an unprotected memory region.

13. A storage system comprising:
a plurality of non-volatile memory devices which are divided into a plurality of namespaces, and are configured to store data corresponding to each namespace of the plurality of namespaces; and
a storage controller configured to drive the plurality of non-volatile memory devices,
wherein the storage controller is further configured to:
receive a permanent write protection command corresponding to a first namespace,
check a distribution of first data included in the first namespace,
set a protected memory region based on at least one metric corresponding to each of the plurality of non-volatile memory devices, and
based on the protected memory region being set:
migrate the first data to the protected memory region, and
migrate second data included in a second namespace and stored in the protected memory region to a remaining memory region different from the protected memory region.

14. The storage system of claim 13, wherein the at least one metric includes at least one of a PE cycle, a read count, a temperature, a block position or a usage time of the plurality of non-volatile memory devices.

15. The storage system of claim 13, wherein the protected memory region is physically independent from the remaining memory region.

16. The storage system of claim 13, wherein the storage controller includes:
a central processing unit (CPU) configured to receive the permanent write protection command and generate an internal command, and
wherein the storage controller is further configured to perform an access operation on the first data and the second data in the plurality of non-volatile memory devices for the each namespace according to the internal command.

17. The storage system of claim 16, wherein the storage controller is further configured to:
check a namespace of received data which is received from a host, and to determine whether the received data is the first data;
calculate retention characteristics of the plurality of non-volatile memory devices based on the at least one metric; and
set a memory region having a highest retention characteristic from among the calculated retention characteristics as the protected memory region, and migrate the first data to the protected memory region and the second data to the remaining memory region, based on the checked namespace.

18. The storage system of claim 17, wherein the first data is written in a single-level cell manner or a multi-level cell manner, and the second data is written in a triple-level cell manner or a quad-level cell manner.

19. The storage system of claim 16, wherein the storage controller further includes:
a parity generator configured to generate additional error correction information about the first data and perform an error correction based on the additional error correction information, and
wherein the storage controller is further configured to migrate the first data and the additional error correction information about the first data together to the protected memory region.

20. A storage device comprising:
a plurality of non-volatile memory devices; and
at least one processor configured to:
receive a permanent write protection command;
determine a distribution of first data included in a target namespace corresponding to the permanent write protection command;
designate a memory region as a protected memory region, based on at least one metric corresponding to the plurality of non-volatile memory devices; and
based on the protected memory region being designated:
locate a portion of the first data which is stored in a remaining memory region different from the protected memory region;
migrate the portion of the first data to the protected memory region;
locate second data which is stored in the protected memory region,
wherein the second data is included in a namespace different from the target namespace;
and
migrate the second data to the remaining memory region.

* * * * *